Patented Sept. 17, 1946

2,407,868

UNITED STATES PATENT OFFICE 2,407,868

PROCESS FOR TREATING REFRACTORY ARTICLES

Theodore Henry David Burke, Eggertsville, N. Y., assignor to Otis Elevator Company, New York, N. Y., a corporation of New Jersey No Drawing. Application April 5, 1945, Serial No. 586,818

2 Claims. (Cl. 117—46)

This invention relates to a process for treating refractory articles and especially bricks suitable for linings of electric furnaces.

In many furnaces, as for example electric furnaces for the production of steel, the refractory linings are subjected to rapid heating and cooling. This results in spalling and the life of the lining is thereby considerably shortened. Silica bricks which are largely used for linings of electric furnaces are peculiarly subject to spalling.

It is the object of the invention to increase the life of furnace refractories and especially the life of silica bricks used as linings in electric furnaces.

The invention involves impregnating articles of refractory material with tar, asphalt or other suitable bitumen, and firing the impregnated articles at a temperature sufficiently high to carbonize the impregnating material. During the carbonizing operation air is kept away from the articles to prevent oxidation. Upon completion of the carbonizing operation the articles are allowed to cool and are then ready for use.

I have found that by processing commercial silica bricks as set forth below very satisfactory results have been obtained and the bricks produced have a life of approximately three times that of non-processed bricks.

The bricks are preheated to between 200° and 300° F. and are then immersed in a vat containing tar which is maintained at a temperature of approximately 250° F. After the bricks are thoroughly impregnated with tar, which takes from one to three hours, they are removed from the vat and allowed to drain and cool. The bricks are then placed in retorts and packed with sand to prevent air infiltration after which the retorts are placed in a kiln. The temperature is raised to approximately 1550° F. and maintained there for from ten to twelve hours for the purpose of effecting carbonization. The retorts are then withdrawn from the kiln and the bricks are allowed to cool in the retorts to a temperature below 800° F. The bricks are then removed from the retorts and are ready for use.

The carbon content of a finished brick is about four and one-half percent (4½%) and the distribution of the carbon throughout the brick is very uniform.

None of the temperatures or times specified above are critical. For example the temperature of the impregnating material during impregnation may be as high as 500° F. which is well below the flash point of both tar and asphalt, and the time during which the bricks are immersed in the impregnating material may be any amount beyond the minimum required for impregnation. It is to be understood that higher temperatures make the impregnating material more fluid and thus influence the time required for thorough impregnation; also different materials act differently. The temperature at which the impregnated bricks are carbonized is likewise not critical and may vary from 1450° to 1650° F., it being necessary to have a high enough temperature to effect carbonization. The time required for the carbonizing operation will, among other things, depend on the size of the bricks and the construction of the kiln.

Many variations in the process may be made without departing from the invention. Therefore the descriptive matter is to be regarded as illustrative and not in a limiting sense.

What is claimed is:

1. The process of treating a silica brick to increase its resistance to spalling which comprises, immersing the brick in liquid tar maintained at a temperature between 250° and 500° F., removing the brick from the tar and allowing the excess tar to drain off, packing the brick with sand in a retort, and firing the brick at a temperature of from 1450° to 1650° F.

2. The process of treating a silica brick to increase its resistance to spalling which comprises, immersing the brick for a period of from one to three hours in tar maintained at a temperature of from 250° to 500° F., removing the brick from the tar and allowing the excess tar to drain off, packing the brick with sand in a retort to prevent air infiltration, and firing the brick in a kiln for a period of from ten to twelve hours at a temperature of from 1450° to 1650° F.

THEODORE HENRY DAVID BURKE.